(12) United States Patent
Wooley

(10) Patent No.: US 6,224,012 B1
(45) Date of Patent: May 1, 2001

(54) ROADABLE AIRCRAFT COMBINED VEHICLE FOR PRACTICAL USE

(76) Inventor: Donald H. Wooley, 252 Las Miradas Dr., Los Gatos, CA (US) 95032-7687

( * ) Notice: Subject to any disclaimer, the term of this patent is extended or adjusted under 35 U.S.C. 154(b) by 0 days.

(21) Appl. No.: 09/227,286

(22) Filed: Dec. 30, 1998

(51) Int. Cl.[7] .................................................. B64C 37/00
(52) U.S. Cl. ................................. 244/2; 244/49; 244/87; 244/56; 244/121; 244/130
(58) Field of Search .................... 244/2, 46, 49, 244/50, 120, 87, 56, 66, 45 R, 55, 90 R, 109, 121, 110, 130

(56) References Cited

U.S. PATENT DOCUMENTS

| | | | |
|---|---|---|---|
| 2,384,296 | * | 9/1945 | Gluhareff ................................ 244/66 |
| 2,505,652 | * | 4/1950 | Schweitzer et al. ............. 244/110 G |
| 3,012,737 | * | 12/1961 | Dodd ........................................ 244/2 |
| 4,401,338 | * | 8/1983 | Caldwell ............... 244/130 |
| 4,690,352 | * | 9/1987 | Abdenour et al. .................... 244/130 |
| 5,201,478 | * | 4/1993 | Wooley ..................... 244/2 |
| 5,435,502 | * | 7/1995 | Wernicke ................. 244/2 |
| 5,597,137 | * | 1/1997 | Skoglun ................. 244/66 |
| 5,984,228 | * | 11/1999 | Pham ....................... 244/2 |

* cited by examiner

Primary Examiner—Galen L. Barefoot

(57) ABSTRACT

A vehicle that combines the freedom and swiftness of flight with the utility of surface travel. A simple, light weight, safe and stable conveyance with positive yaw-roll coupling, special safety features, no fold wing stowage and a unique single power source. It can be built using common tools and techniques with readily available materials at a cost competitive with the family automobile.

14 Claims, 8 Drawing Sheets

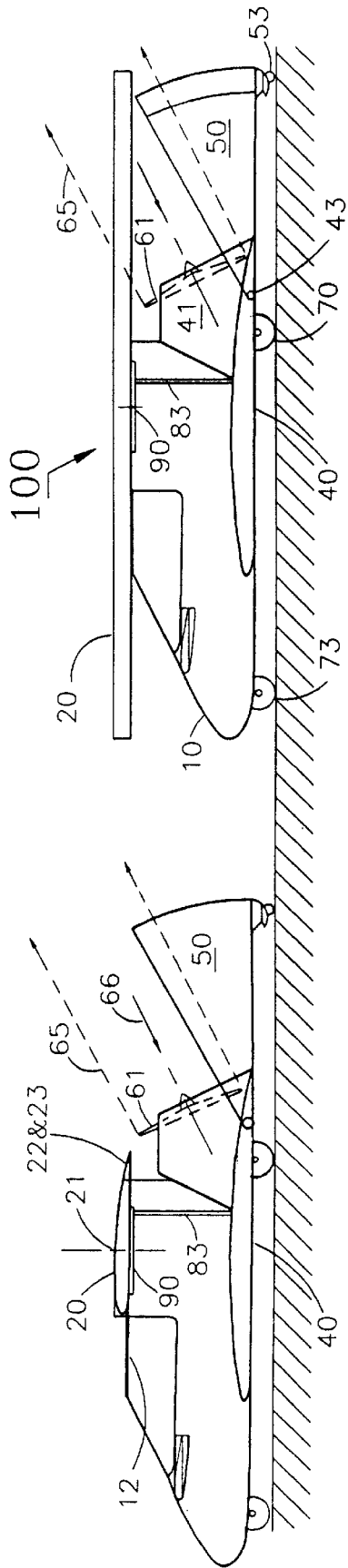

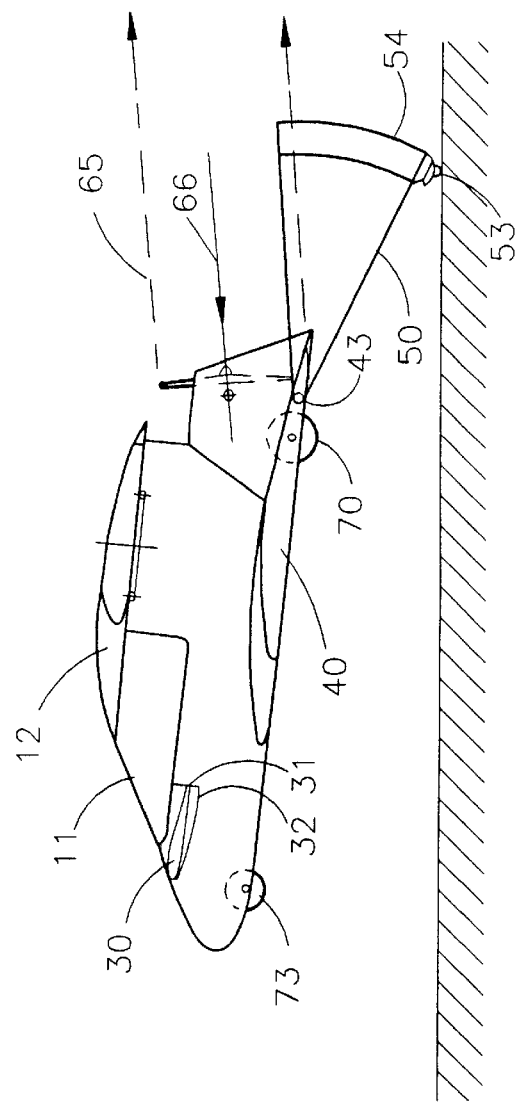
FIG. 1C LIFTING OFF
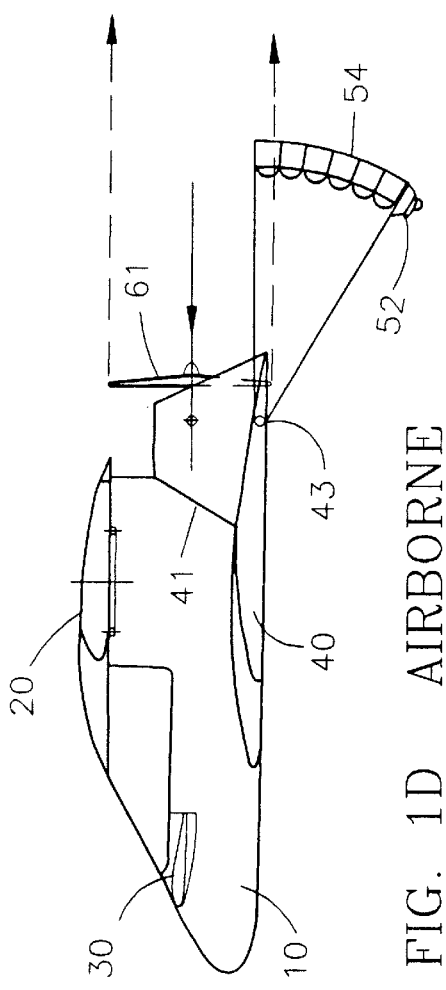
FIG. 1D AIRBORNE

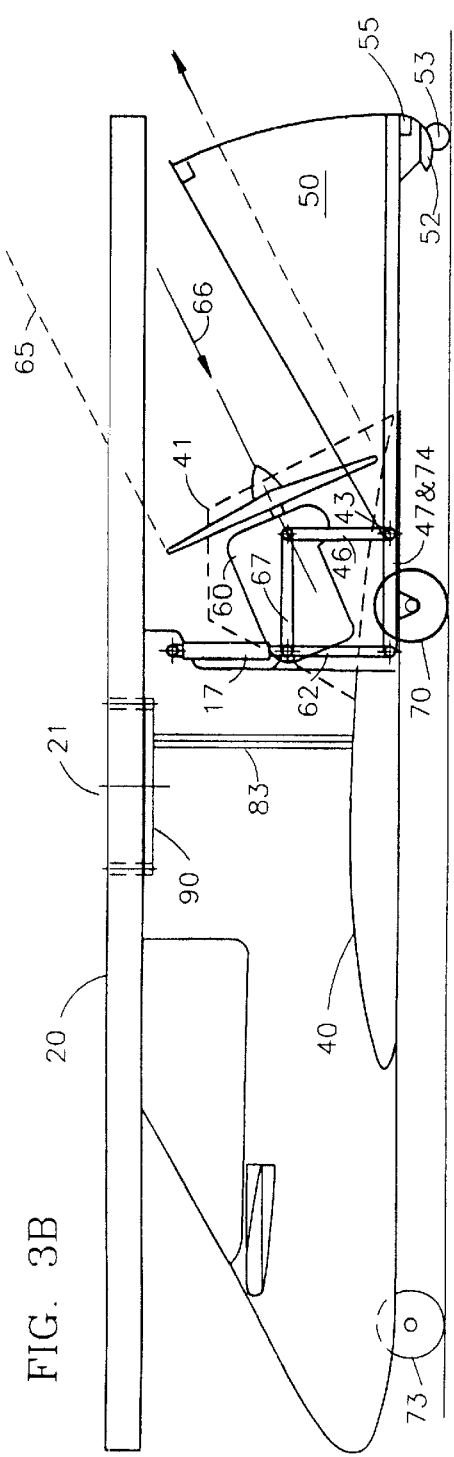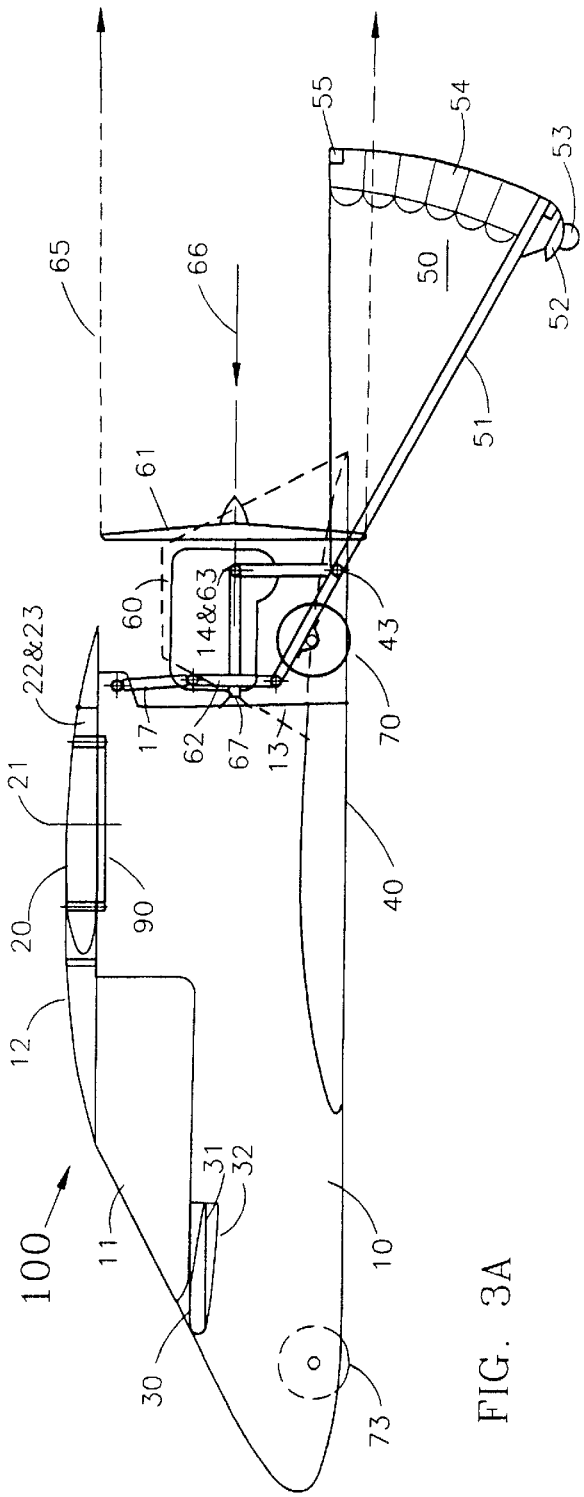
FIG. 3B
FIG. 3A

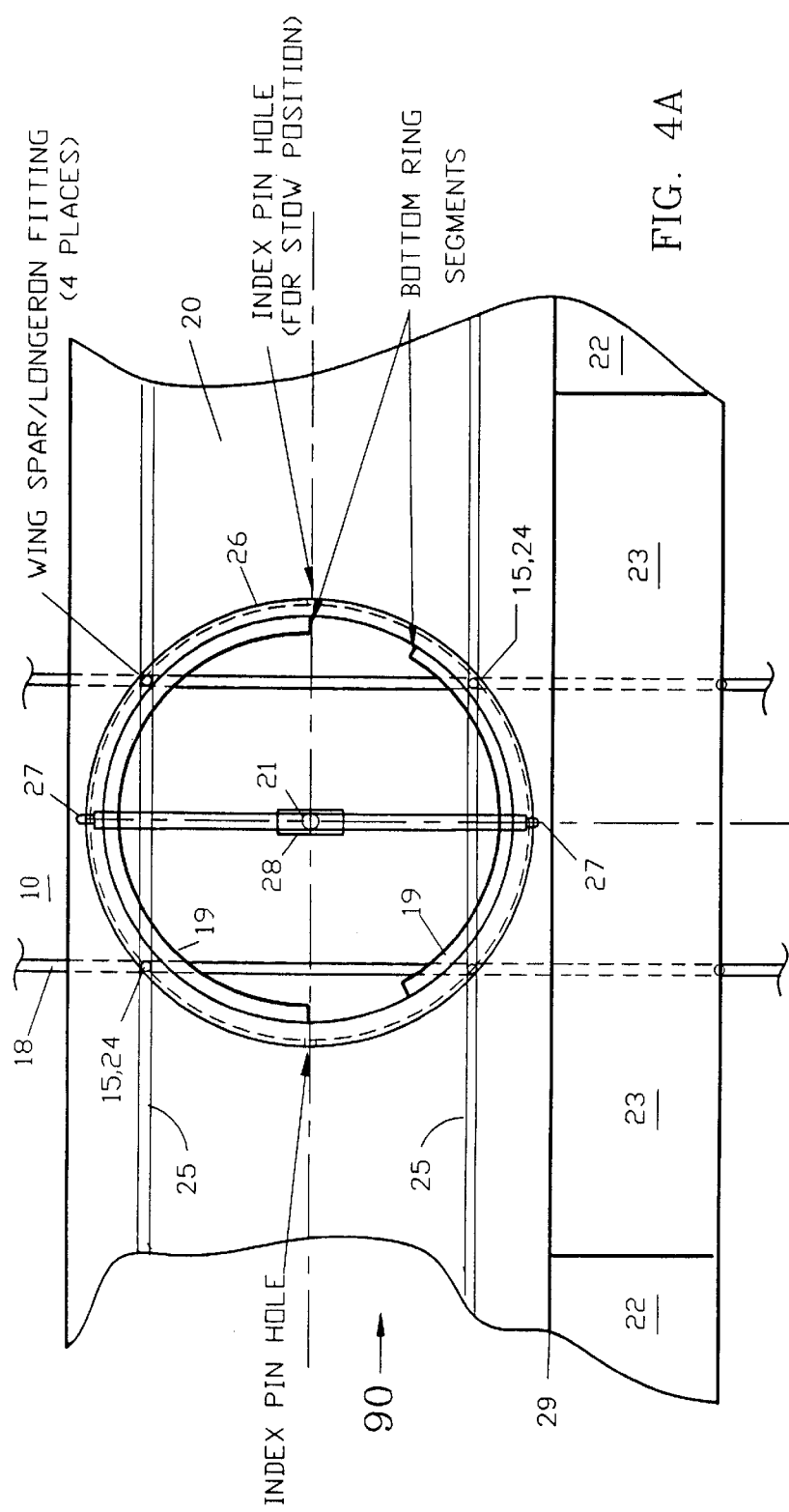
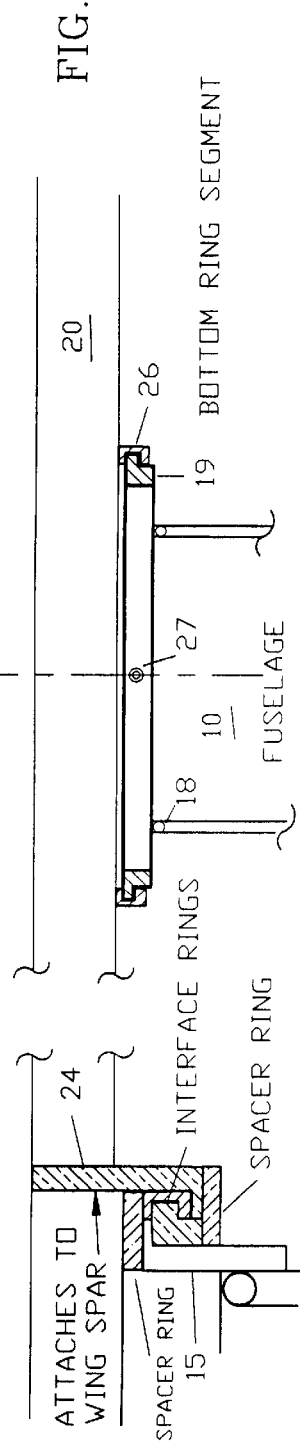
FIG. 4A
FIG. 4B

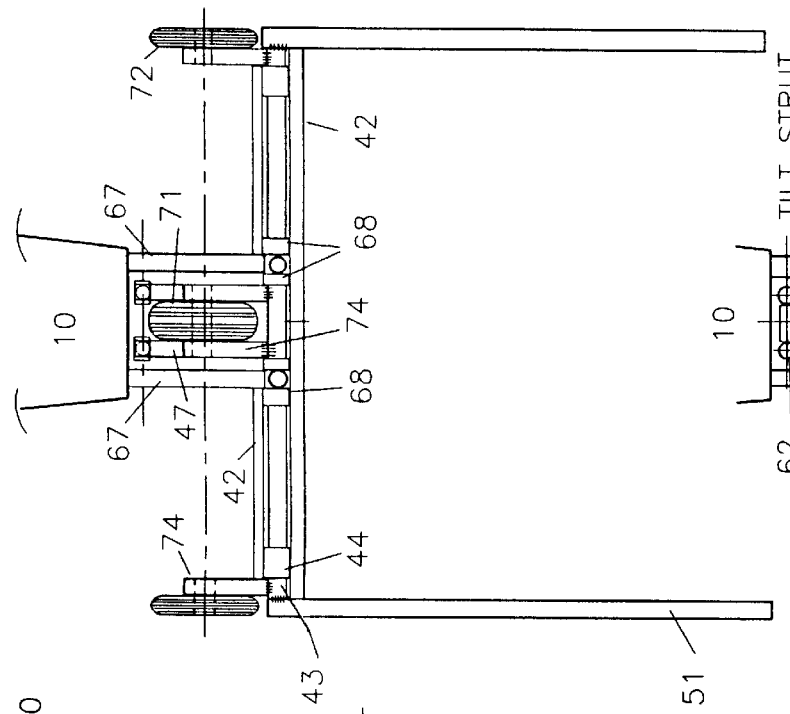
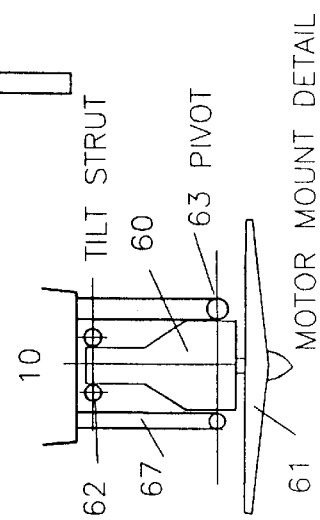
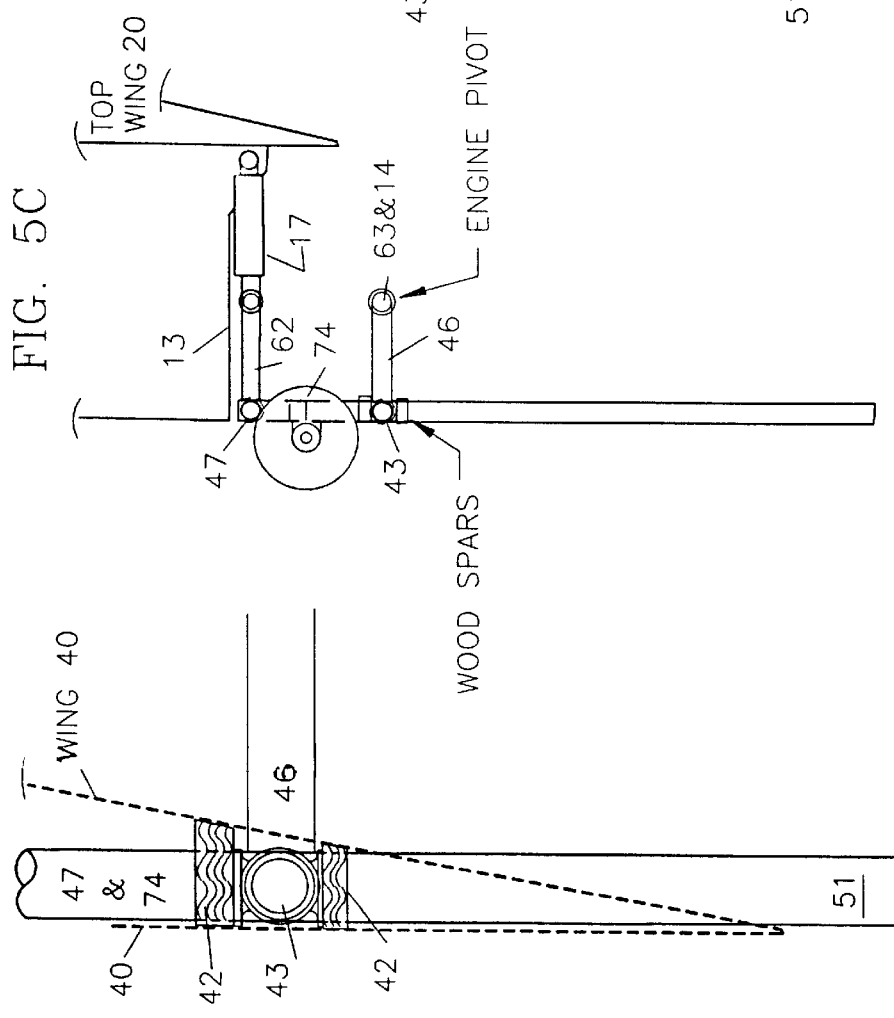

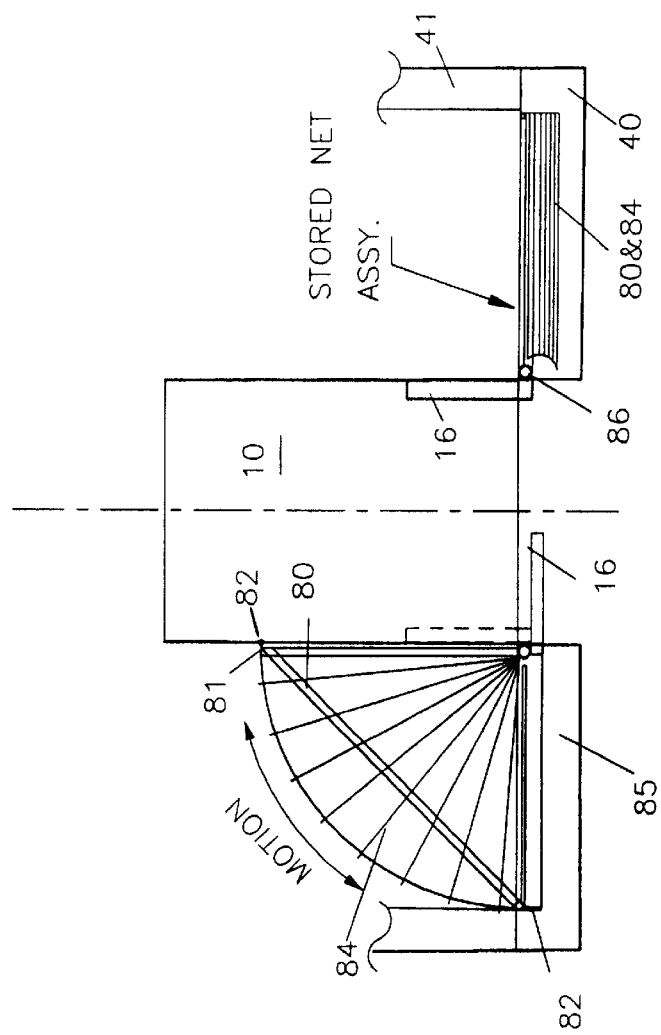
FIG. 6 SAFTY NET DETAIL
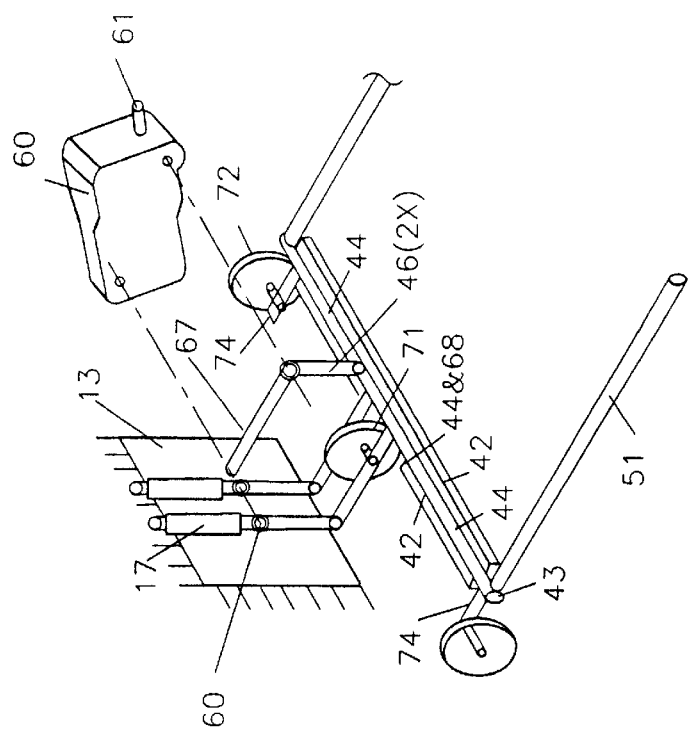
FIG. 7

ROADABLE AIRCRAFT COMBINED VEHICLE FOR PRACTICAL USE

BACKGROUND-FIELD OF INVENTION

This invention provides a relatively simple and low cost airplane that is capable of extended ground travel that eliminates weight, cost and use penalties of prior concepts.

BACKGROUND DESCRIPTION OF PRIOR ART

Over the years numerous attempts have been made to devise a way to combine the utility of the automobile with the advantages inherent with the freedom and swiftness of flight.

Previous attempts were made by D. H. Wooley in U.S. Pat. No. 5,201,478 (1993) entitled "Airplane Efficiency, Safety and Utilization" and fifteen other similar patents referenced in that document. That attempt and all other previous attempts have not proven to be practical or competitive with conventional means to tranport people in the commuting range (nominal 30 to 300 miles) where it would be most useful and in demand. However, the above patent presented several features that resolved deficiencies of prior proposals but did not satisfactorily address the ground propulsion weight penalty issue and the flight surface stowage problem. This proposal presents novel concepts to resolve these two issues to make a complete, low cost machine that uses easy to get hardware.

This present invention includes a radical approach to the challenge with a novel means of propulsion and a simplified conversion from one mode of travel to the other mode of travel that eliminates the weight, complexities and cost penalties of prior art.

OBJECTS AND ADVANTAGES

The objects and advantages of this means of ground propulsion and stowage of flight surfaces are:

(a) a separate means of propulsion for ground travel is not required and the need for an aft fuselage, clutch, transmission, drive shaft, differential, and ground drive wheel is eliminated;

(b) the stowage of flight surfaces for ground travel is reduced to a simple central pivot of the main wing with no folded or jointed wing structure other than the usual hinged control surfaces;

(c) a flexible safety grid is deployed only on the ground to prevent objects from being drawn into the engine or striking the propeller or propellers;

A summary of the special features of this invention [denoted by (new)], and including the prior patented features of Pat. No. 5,201,478 [denoted by (prior)] are as follows:

1. (new) Ground travel propulsion is provided by aerodynamic means (propeller or jet) that is oriented or tilted upward to eliminate air blast impingement on other vehicles or objects with this same means of propulsion capable of being orientated to provide optimum alignment of thrust for flight;

2. (new) The apparent incompatibility of combining a light weight aircraft with a road traveling vehicle that must be made heavy enough to withstand cross-winds and undulating roadways cannot be remedied by simply making the machine heavier. However, the tilting of the power thrust vector provides the needed force to counteract wind force and inertial forces caused by roadway perturbations. This needed counteracting force is provided by the downward thrust component;

3. (new) No aft fuselage, no clutch, no transmission, no drive shaft, no differential, and no ground drive wheel are required with this concept;

4. (new) A top mounted one-piece, light weight, high strength state-of-the-art wing that rotates horizontally a nominal 90 degrees that has a span that is about the same length as the overall length of the vehicle provides a simple, light weight means of converting flight surfaces for ground travel;

5. (new) A light weight, high strength flexible grid or net (nylon or equivalent) that is deployed only during ground travel prevents objects from entering or striking the propulsion system when it is required and is aerodynamically clean when stowed;

6. (new) The lower support wing rear spar is comprised of a fixed section and a pivoted section that provides the necessary connection between the vertical twin tails, the main support wheels and the engine ganged together to pivot as a unit. Individual wheel suspensions and individual shock absorbers are not shown for clarity but these components may be required;

7. (new/prior) Twin vertical tail/support wheel assemblies that are pivoted provide downward projected surfaces and gear retraction during flight and upward rotated surfaces and main support gear extension during ground travel with an integral arrestor hook incorporated into each assembly near the rear support wheel;

In summary, the above new features are to be incorporated into the combined vehicle concept of Pat. No. 5,201,478 and all features of that vehicle are retained in this present invention except the overall cambered contour of the fuselage is not maintained (no aft body) and structural complexities and heavy components cited above have been eliminated. The prior features are retained to provide the most practical and usable overall configuration to meet the challenges of the goal of a competitive vehicle. These prior features are as follows:

(a) (prior) Automatic main gear retraction and extension provided by the vertical tail pivot feature that requires no operator assistance;

(b) (prior) Variable thrust vectoring inherent with the tilted thrust feature with separate operator adjustment means;

(c) (prior) Positive yaw/roll coupling instead of adverse coupling due to lowered placement of the vertical tail provides natural coordinated turn/bank response for smoother control;

(d) (prior) Less vertical tail area required by tail being more effective in unobstructed higher energy airflow;

(e) (prior) Minimized ground clearance of vehicle provided by pivoted aft assembly that automatically maintains propeller or jet clearance during all phases of operation including take off and landing rotations;

(f) (prior) Maximized aerodynamic ground effect by lower support wing coupled with minimum legal ground clearance;

(g) (prior) Lower height and profile area provided by minimized ground clearance and "inverted" vertical tail lessens cross-wind forces during ground travel and reduces ground handling and servicing equipment and eliminates scaffolding and tall hangar facility requirements;

(h) (prior) The safety hook feature is retained by applying this hardware to both pivoted aft vertical tail and support wheel assemblies thus increasing its effectiveness.

DRAWING FIGURES

FIGS. 1A to 1D, sequentially show the side view of the combination vehicle in the ground travel configuration with the engine (or propulsion source) tilted and the wing aligned with the fuselage, then with the wing rotated for flight followed by the body lifting off and then full liftoff with the vertical tail rotated downward which causes the main gear to retract and engine thrust to be aligned for flight.

FIGS. 2A and 2B show the plan and frontal views in the flight configuration with the wing deployed, the twin tails rotated downward, the main gear retracted and the propulsion means aligned for flight. Similarly, FIGS. 2C and 2D show the same views with the vehicle in the ground travel configuration with the wing in the stowed position, the twin tails rotated upward by contact of the tail wheels with the ground which extends the main gear and causes the power source to be tilted.

FIG. 3 depicts an embodiment that provides the necessary components to rotate the power source between the ground tilt angle and flight alignment and the components to rotate the vertical twin tails and the main wheels through the employment of a pivoted spar. This spar connects all pivoted components, provides support for the central main wheel and two outrigger wheels and provides support for the motor mount.

FIG. 4 shows the details of the top wing pivot and how it is indexed and locked in either the flight deployment position or the stowed ground position. The pivot is located at center span (not at mid chord) and at the mid point of the overall length of the vehicle.

FIG. 5 provides details as to how the engine, wheels and tail assemblies can be connected together to provide tilting of the engine on the ground and rotation of the wheels and tail assemblies from ground to flight orientation and back to ground travel positions.

FIG. 6 illustrates how two nylon or equivalent light weight nets can be employed to protect the power unit and propeller or jet intake from objects while on the ground. The nets deploy from a fully retracted aerodynamically clean stowed position to a one-quarter fan position by rotation of a lever in the fuselage.

FIG. 7 is an illustration to more clearly show how all the components are located along the universal pivotal spar, how the engine is supported and how the spar is connected to the fixed rear spar of the lower support wing.

Figures 2A, 2B:
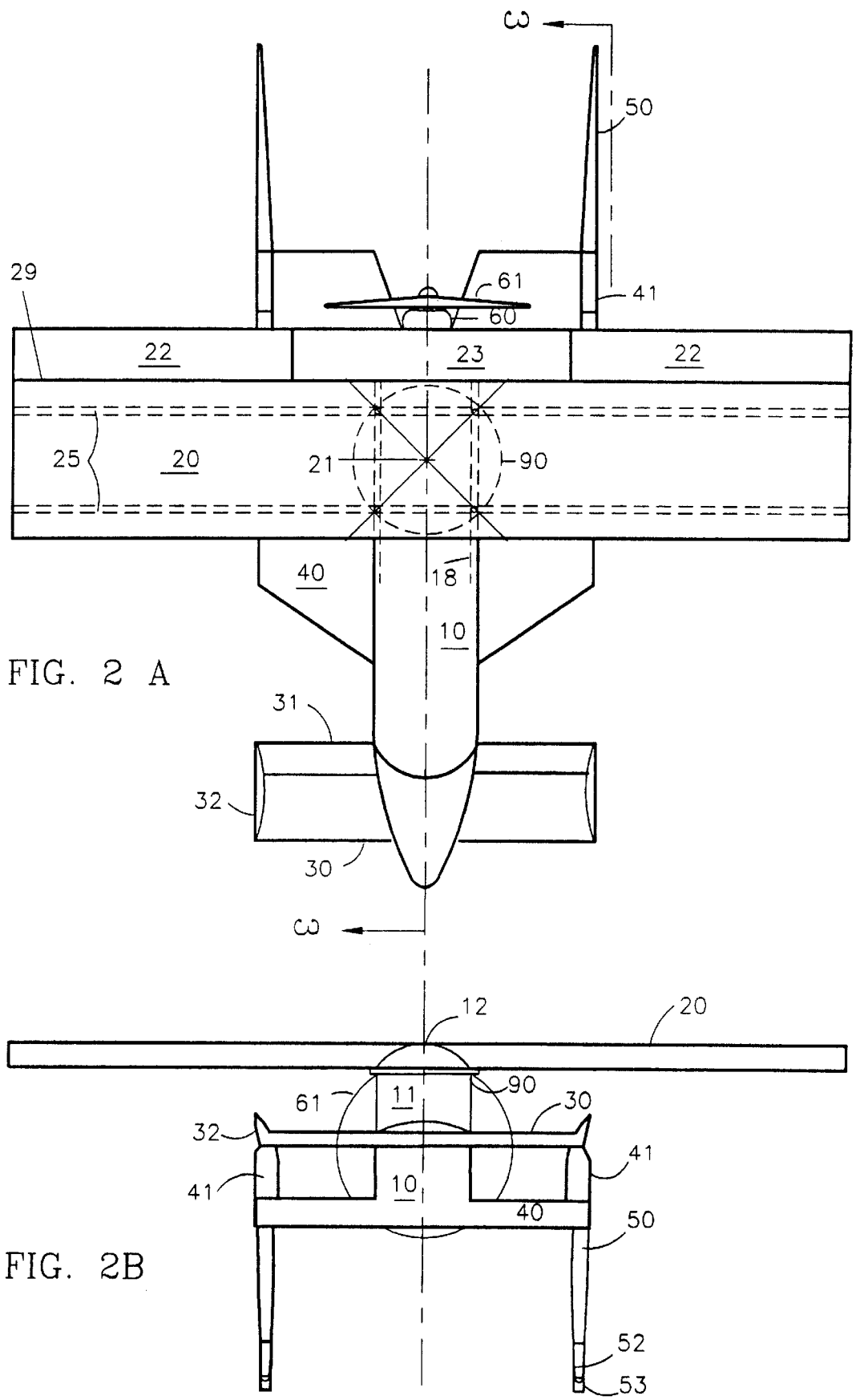

| Reference Numerals in Drawings and Figures | |
|---|---|
| 100 combined vehicle | |
| 10 fuselage | 60 power unit (engine) |
| 11 canopy | 61 propeller |
| 12 wing fairing (membrane) | 62 engine position strut |
| 13 firewall | 63 engine pivot |
| 14 engine mount | 64 engine bracing member |
| 15 fuselage interface fttg. | 65 prop or jet airflow |
| 16 net rotation lever | 66 power thrust vector |
| 17 body/tail shock | 67 engine support beam |
| 18 longeron | 68 engine support bearing |
| 19 fuselage/wing inner pivot ring (two segments) | 69 engine cooling cowling |
| | 70 wheels (main & outriggers) |
| 20 top wing | 71 main support wheel |
| 21 top wing rotation center | 72 outrigger wheels |
| 22 aileron | 73 nose wheel |
| 23 flap | 74 wheel support arm |
| 24 wing interface fitting | |

| -continued | |
|---|---|
| Reference Numerals in Drawings and Figures | |
| 25 wing spar | 80 net webbing |
| 26 wing outer pivot ring | 81 net spar |
| 27 wing index lock pin | 82 net spar latch (anchor/holding) |
| 28 zero lash-up assembly | 83 safety net assembly |
| 29 aileron/flap hinge line | 84 net spine |
| | 85 net stow cavity |
| | 86 net pivot |
| 30 canard wing | |
| 31 elevator | 90 wing pivot assembly |
| 32 canard winglet | (rings & fittings) |
| | FIGURES |
| 40 support wing | 1A side view - at rest |
| 41 winglet | 1B side view - take-off ready |
| 42 rear fixed spar (front & rear) | 1C side view - lifting off |
| | 1D side view - airborne |
| 43 universal spar (rotates) | 2A plan view - flight configuration |
| | 2B front view- flight configuration |
| 44 spar support bearing | 2C plan view - ground configuration |
| 46 engine pivot post | 2D front view- ground configuration |
| 47 engine orientation arm | 3A cross sectional - flight |
| | 3B cross sectional - ground |
| 50 vertical tail | 4A plan view - wing pivot detail |
| 51 tail boom | 4B front view- wing pivot detail |
| 52 tail hook | 5A plan view - tail/body detail |
| 53 tail wheel | 5B plan view - motor mount/tilt |
| 54 rudder | 5C side view - tail/body detail |
| 55 strobe light | 5D universal spar pivot detail |
| | 6 safety net detail |
| | 7 tails/wheels/engine perspective |

SUMMARY

A summation of all the features of this complete composite vehicle shows that anyone skilled in the field can build this light weight, low cost machine that can perform with minimum weight and performance penalties to be competitive with existing modes of commuter range type travel.

Simply stated, for such a conveyance to be practical it must be light weight and yet be capable of stable, safe travel on the ground. It must be capable of converting from one mode of travel to the other and back again with no loss of time and negligible effort. It must be safe to fly and have a means to safely land on unimproved ground in an emergency. It must be cheap to buy or build and operate at least commensurate with the family automobile. It can be accepted initially by the public for restricted use but once such a means of travel is available restrictions can be lifted as demand and attitudes change the motor vehicle codes and similar constraints. This present invention can meet all these challenges.

Embodiment Description-FIGS. 1 to 7

Referring to the drawings, FIG. 1A shows a combination vehicle 100 in its ground travel mode with a top wing 20 in the ground stow position, a fuselage 10 and a propeller 61 tilted approximately thirty degrees so that airflow 65 is diverted upward. Top wing 20 is secured by a wing pivot assembly 90 for surface travel. The propeller 61 is protected by a lower support wing 40 winglet 41 and a safety net assembly 83 that is extended only when required on the ground. A pair of pivoted vertical tails 50 are held in the up position by a pair of tail wheels 53 which cause a set of three main support wheels 70 to be extended. These support wheels are comprised of a center main wheel 71 and a pair of two outrigger wheels 72 that all roll and turn in unison. Ground travel is controlled by a steerable nose wheel 73 with tail wheels 53 capable of swiveling in any direction. Tails 50 pivot about universal spar 43.

FIG. 1B shows the vehicle ready for the takeoff roll with wing 20 rotated ninety degrees from the stowed position. Wing pivot 90 is comprised of two interfacing rings with a center of rotation 21 located at mid span and the mid point of the overall length of the vehicle. A pair of ailerons 22 and a center flap 23 are shown in the flight position but these flight controls are inverted to rest upside down in the stow position when the wing is aligned for ground travel.

The rotated wing leaves a gap between the wing and the fuselage that is enclosed by a flexible wing fairing membrane 12 that assumes a smooth contoured shape in flight by the airflow over it. Safety nets 83 are completely retracted to aerodynamic clean stowage in support wing 40 cavities. The takeoff roll is made with the propeller airflow 65 directed upward and engine thrust 66 directed downward as shown. This downward thrust provides stability for the light weight surface traveler.

FIG. 1C shows the vehicle lifting off with tail 50 in an intermediate position with wheels 70 and 73 semi-retracted with tail wheel 53 still in contact with the ground. Directional control is taken over by a segmented rudder 54 that minimizes pitch trim change coupled with tail wheel preload reduction. A canard wing 30 and a canard elevator 31 with winglet 32 provides the pitch control for lift off and flight. Support wing 40 aids the top and canard wings with additional lift as well as providing a ground support function. The wing fairing 12 assumes a streamlined shape and propeller thrust 66 with airflow 65 rotated from a tilted ground deflected orientation toward a flight aligned position. A canopy 11 together with wing fairing 12 provide enclosure for the operator.

FIG. 1D shows the vehicle fully airborne with the tail fully lowered that allows rudder 54 to operate in undisturbed airflow. Propeller 61 is fully aligned for flight with the fuselage 10, the wings 20 and 40 and the winglet 41 all contributing to lift as is the lifting canard wing 30. A tail hook 52 provides some degree of safety for emergency landings on unprepared surfaces that will not support the tail wheel by quickly arresting the forward speed of the vehicle upon ground contact without damage.

FIG. 2A shows the plan view of the vehicle in the flight condition. The top wing 20 is in the deployed position with the ailerons 22 and flap 23 flipped over from the inverted stowed condition to the flight position. These control surfaces rotate about a double hinge line 29. Canard 30 and elevator 31 have a winglet 32 to cover the open end of this wing to provide some physical protection and for aerodynamic effect. An engine 60 and propeller 61 are depicted in the flight aligned position. The top of winglets 41 are shown as are the twin tails 50. The winglets house the retracted outrigger wheels. The wing pivot assembly 90 is shown in this vehicle plan view to illustrate how it is located relative to a pair of wing spars 25 and the fuselage 10 side longerons 18. The center of rotation 21 is shown with a circle indicating the outer edge of the interfacing rings of that assembly which is detailed in FIG. 4. Support wing 40 is swept for aerodynamic and access reasons.

FIG. 2B is the frontal view of the vehicle in the flight configuration with wing 20 extended and twin tails 50 lowered which rotates the propeller 61 to flight alignment and retracts the three main support wheels. The nose wheel is retracted by direct access of the operator and tail wheels 53 do not retract. A pair of tail hooks 52 are shown as they would appear coming in for an emergency landing. The canard 30 and winglets 32 are located about ten feet forward of support wing 40 winglets 41. The top wing pivot assembly 90 is wider than fuselage 10 but the interface load transfer points are at the sides of the fuselage. Wing fairing 12 is shown in its flight condition that smoothly contours the fairing with the canopy 11 windshield.

Figure 2C:
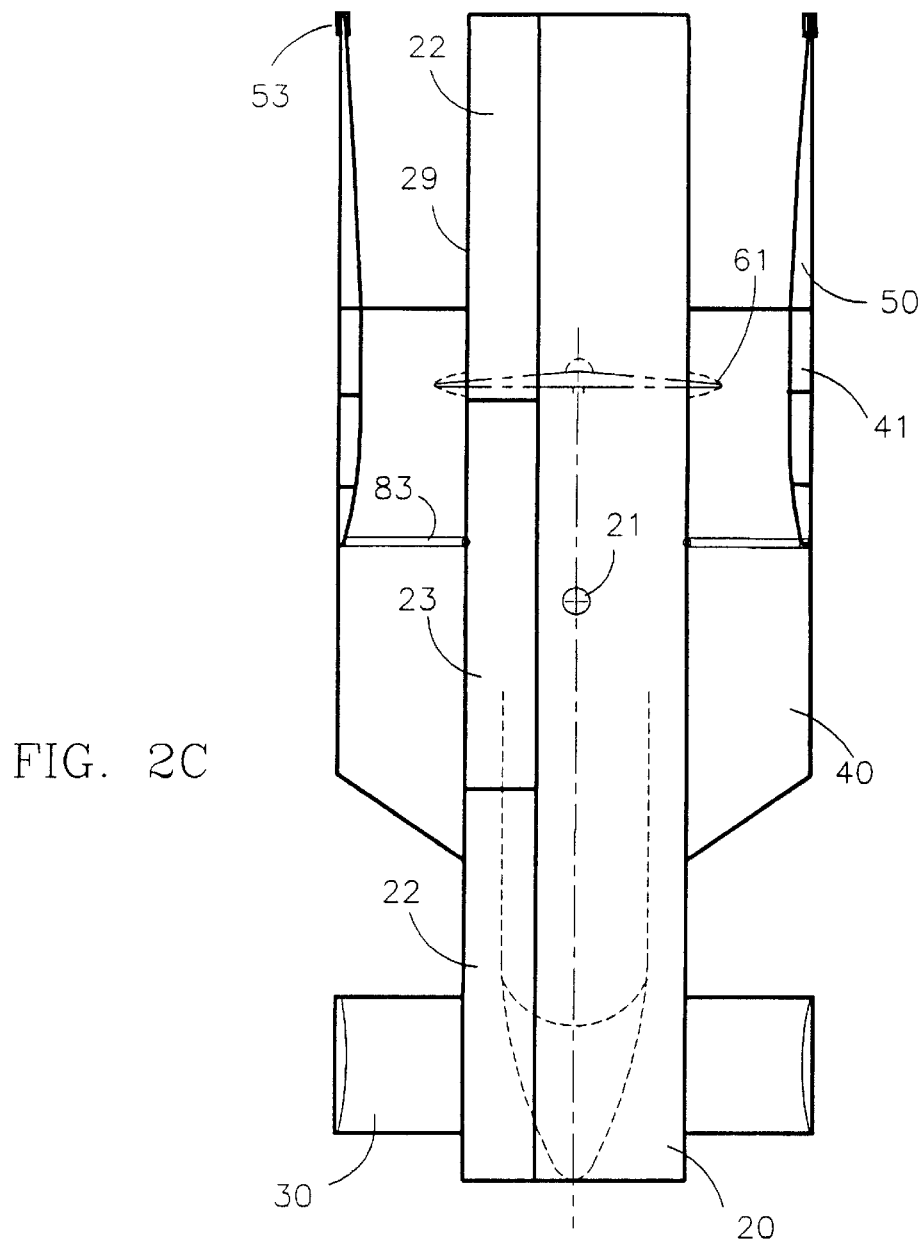

FIG. 2C is the plan view of the vehicle in the road travel configuration. Top wing 20 is rotated about center of rotation 21 with ailerons 22 and flap 23 flipped upside down about double hinge line 29 to reduce its area and to negate lift. Canard wing 30 is the same span or width as support wing 40 and does not fold. Tail wheels 53 rotate tails 50 upward and tilt propeller 61 approximately thirty degrees. The left and right side safety net assemblies 83 are deployed by a pair of levers inside the fuselage by the operator. This net coupled with winglets 41 provide protection for propeller 61.

Figure 2D:
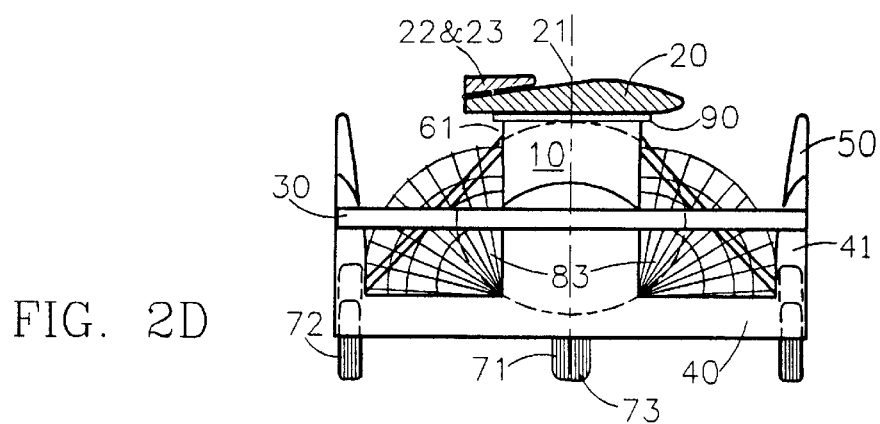

FIG. 2D depicts the frontal view of the vehicle as a surface traveler. Safety net assemblies 83, winglets 41 and vertical tails 50 on the left and right sides of the vehicle protect the engine and propeller. A stable four wheel support system is comprised of nose wheel 73, main wheel 71 and two outrigger wheels 72. The support wing 40 and fuselage 10 provide the structure and space to connect and carry all vehicle components. Canard wing 30 is the same width as the support wing which is the maximum allowed. Top wing 20 span is about the same length as the overall vehicle length. Its chord from leading edge to trailing edge is as long as practical considering the constraints on the design but the chord is reduced in the stowed position because ailerons 22 and flap 23 rest on top of wing 20.

The center of top wing rotation 21 is on the vehicle center line. As stated above, the propulsion unit and propeller are tilted a nominal thirty degrees for ground travel thus propeller 61 appears as an ellipse in this frontal view. The top wing is securely held by the wing pivot assembly 90 with zero lash-up tolerance.

FIGS. 3A and 3B show the profile of vehicle 100 in its flight configuration and its ground travel condition, respectively. When two tail booms 51 and two tails 50 are rotated downward, as shown in FIG. 3 two engine orientation arms 47 and two main wheel and two outrigger wheel support arms 74 are all rotated upward. This orientation levels engine thrust 66 and airflow 65 for flight and retracts the main support wheels 70.

FIG. 3 shows the above described components in the ground travel positions which are that engine 60 and prop 61 are tilted approximately thirty degrees and the support wheels are automatically extended. Nose wheel 73 is extended manually by direct access of the operator. Tail wheel 53 and hook 52 do not retract. Winglets 41 give vertical enclosure for the propeller.

A body/tail shock 17 controls and restricts pivoted mass motion and has an operator override feature. The central engine installation depicted has an engine mount 14, an engine pivot 63, an engine position strut 62, and an engine support beam 67 that is attached to a fire wall 13. The universal spar 43 is attached to the rear fixed spar of support wing 40 that goes through fuselage 10.

Top wing 20 pivots about its center of rotation 21 with ailerons 22 and flaps 23 inverted in the ground stowed position. A wing pivot assembly 90 securely attaches wing 20 to fuselage 10 under all conditions. The wing fairing 12 is made of a fabric reinforced membrane material that is attached to the top of canopy 11. This fairing is expandable and moves from a flat position in the ground condition to the smooth contoured shape during flight. Canard wing 30 and elevator 31 have a winglet 32 at their outer ends to provide some degree of protection while on the ground and to aid flight performance. Two pairs of strobe lights 55 are energized during all vehicle operations in flight and during ground travel for added safety.

Segmented rudder 54 is depicted because rudder action is affected by tail position. The segmented rudder allows for differential programming of rudder segments to hold pitch trim coupled with the body/tail shock 17 override function. Vertical tail 50 and rudder 54 may appear to be of insufficient area but the location of these components is below the fuselage in undisturbed airflow and thus are more effective. Also, the low placement provides positive yaw/roll coupling which minimizes the amount of surface area that is required. Thus when a turn is made the rudder force couples with a rolling force to make a coordinated banked turn instead of an adverse coupling where the rudder yaw force causes a roll force in the opposite direction as occurs when the tail is mounted above the primary longitudinal axis of the vehicle.

FIG. 4 illustrates how top wing 20 can rotate a nominal ninety degrees by interfacing fuselage inner ring segments 19 and wing outer circular pivot ring 26 without a center pivot. The center of rotation 21 is located at center span and at the center of the overall length of the vehicle from nose to tail. The center of rotation is not at the mid chord location but at the mid point between the two wing spars 25 so that the stowed position of the wing can be offset for ground travel. This setup allows the wing to be centered for flight but yet positioned off center for ground travel with the ailerons 22 and flaps 23 inverted to rest on top of the wing so that wing area and wind effects can be minimized.

FIG. 4 shows details of top wing pivot assembly 90. Top wing 20 has a permanently attached wing outer pivot ring 26 with a recessed groove that mates with a projection of a segmented inner pivot ring 19 that is attached to fuselage 10 structure. The forward segment of inner ring 19 is permanently attached to a pair of fuselage longerons 18 and the aft segment is attached to the fuselage after the wing is mated to the forward segment which allows the inner and outer rings to be assembled. Rear inner ring segment 19 is adjusted to provide a sliding fit between the rings and a zero lash-up device 28 (can be a simple turnbuckle between two tubes with index pins) together with a pair of index pins 27 secure the wing rigidly in either the deployed flight position or the stowed ground travel position.

Wing loads are transferred to the fuselage at the four locations where wing spars 25 intersect with the sides of the fuselage frame thus high flight and ground travel loads are handled by a pair of interface fittings 15 and 24 at the four locations whereas wing rotation is handled by the rings during the conversion phases of operation. A lever linkage in the cockpit connected to the wing provides the means to swing the wing to either position. When the wing is rotated to the stowed position the ailerons 22 and flaps 23 are flipped upside down about hinge line 29 thus centering the wing over the fuselage.

FIG. 5 shows how tail booms 51, power unit 60 with prop 61, wheels 70 (70 denotes the primary support wheels which are main wheel 71 and the outrigger wheels 72) are all interconnected or ganged together by their attachment to universal transverse spar 43 which extends across the full width of support wing 40. Spar 43 is sandwiched between wing 40 rear spars 42 (forward and aft) by pivot bearings 44 and 68. Universal transverse spar 43 positions engine 60 and wheels 71 and 72 in either the flight or ground travel angular orientations and the spar also provides support for engine pivot posts 46 through bearings 68. Finally, spar 43 provides support for pivoted wheels 70 and the pivotal twin tails that are integral with tail booms 51.

To further clarify the FIG. 5 hardware, FIG. 5 shows wheel support arms 74, and engine orientation arms 47 that rotate with tail booms 51. Movement is restrained by shocks 17 anchored to fuselage 10 just below top wing 20. Engine pivot posts 46 are connected to spar 43 through bearings 68 that allow spar 43 to rotate. Engine thrust is carried by support beams 67. Power unit 60 is tilted by engine position struts 62 which are connected to engine orientation arms 47. Spar 43 is attached to support wing 40 rear fixed spar by two spar support bearings 44 located near the ends of the spar and two engine support bearings 68. Body/tail shocks 17 provide the required tail wheel preload spring force and motion damping with an adjustable feature that allows operator override for pitch trim adjustment. Engine mount 14 and pivot 63 are near the pivoted weight center.

FIG. 5 depicts how engine 60 is securely anchored at firewall 13 and engine position strut 62 is attached at the forward end of engine 60. FIG. 5C shows body/tail shock 17 attached to engine 60 and the fuselage structure. Engine 60 and beams 67 that anchor to firewall 13 are not shown for clarity. FIG. 5D shows the detail of how universal spar 43 is sandwiched between wing 40 fixed spar 42 thus making the fixed spar and the pivoting spar all contribute to the rigidity of this load bearing structure.

FIG. 6 shows a pair of safety net 83 assemblies. Net webbings 80, spars 81, latches 82, spines 84 and pivots 86 are all flush within fuselage 10 and wing 40 while retracted in wing cavities 85 between winglets 41. A pair of levers 16 "fan" the nets a nominal ninety degrees to full deployment. The net is anchored to the wing and is anchored to a spar that rotates upward ninety degrees that latches to a fuselage fitting. This holds a straight, strong webbing member taut between the two anchor points. This feature is better envisioned in FIG. 2D where it is illustrated as installed in the vehicle. The nets can be deployed or retracted in a few seconds by the seated operator by flipping levers 16 without delay of travel.

FIG. 7 provides a perspective, angled view to better illustrate how the pivoted components are all connected to the universal spar 43. The spar rotates from a position where the tail booms 51 are in a horizontal position with the tails 50 projecting upward to a flight position with the booms about thirty degrees down with the top edges of the tails approximately leveled. This perspective view best illustrates how the various components, including power plant 60, are all connected. This setup allows the vehicle to be positioned with minimum ground clearance while maintaining propeller 61 clearance especially during takeoff and landing rotations. Also less tail area is required and adverse yaw/roll coupling is eliminated.

OPERATION OF COMBINATION VEHICLE

The vehicle is easy to enter over the low ground clearance support wing. A typical trip involves a short distance on the ground which allows proper engine warm-up. Upon reaching the takeoff area the wing is deployed (rotated) for flight without stopping. This is done either manually by a lever or other device located in the cockpit. Locking pins automatically engage to secure the wing for flight. Full power is then applied with nose wheel steering control and then rudder control at nose wheel liftoff. At main wheel liftoff a slight trim change occurs when the thrust tilt angle changes a few degrees. Then when the tail wheel loses contact with the ground the tail assembly slowly rotates downward being constrained in its swing by a tail assembly damper shock. The thrust vector angular change at liftoff is offset by tail wheel preload force change as both affect pitch trim. That is, the thrust vector swings upward causing a nose down trim change but the weight of the tail assembly is now supported by wing lift (instead to the ground) which causes a nose up trim change which is offsetting.

Tail assembly and engine position relative to the front body and flight surfaces is held sufficiently constant by tail assembly shock damping or any relative motion can be sufficiently negated by auxiliary damping if required.

The landing sequence is handled in the usual manner with the trim change caused by tail assembly rotation and engine thrust vector rotation trim change again offsetting each other. The loss of rudder effectiveness as the vehicle slows down is then picked up by nose wheel steering control. The wing is rotated to the stowed position by manually releasing the wing lock pins, rotating the wing where the pins automatically re-engage to lock the wing in the stowed position. Ground travel continues without stopping by applying reduced power to the engine. Conventional hydraulic brakes on all wheels except the two tail wheels are provided. The top wing mounted ailerons and flaps flip over to rest on top of the forward portion of the wing so that the wing does not generate lift while in the stowed position and also to minimize the size of the overhead surfaces. Zero lash-up occurs when lock pins are extended.

CONCLUSION, RAMIFICATIONS AND SCOPE

This combination vehicle concept meets the challenges of combining a light weight airplane structure with a stable low slung road vehicle without the usual weight penalties, complexity penalties, and prohibitive cost penalties of prior inventions. The conveyance is easy to operate with conversions between flight mode and ground travel performed by hand power of the operator without stopping the ground travel. The relative simplicity of the concept ensures competitive costs compared to the cost of the family automobile in both initial outlay and in operating expenses. Anyone skilled in the field can fabricate the machine using available off-the-shelf materials, components and tools and established techniques. The proposed configuration with the arresting device provides greater safety in an emergency landing.

While the above description contains many specificities, these should not be construed as limitations on the scope of the invention, but rather as a presentation of one preferred embodiment thereof. Many other embodiments are possible. For example, twin power units, or even three power units, including shaft turbines or small jets can be placed along the transverse axis with smaller diameter propellers employed that provide more flexibility in the design. Also, the top wing pivot point can be altered to shift the wing laterally in the stowed position.

A summation of the benefits and other considerations of this complete combination vehicle package and additional alternative embodiments follows.

1. The requirement to combine a light weight aircraft with a stable light weight ground vehicle has been met by a novel means of ground propulsion that provides ground travel stability.

2. Stowage of flight surfaces to be within the dimensional limitations for road travel has been devised with the simplicity of a single pivot without the weight or structural penalties of prior means and this is done with minimum vertical area exposure that negates ground travel stability and control.

3. The purpose of this invention is to provide a vehicle that is airborne wherever possible and that travels on the ground only where flight is not possible. It is not intended as a means of transportation to and from the corner grocery store nor is it intended to be a proper conveyance for long journeys. Those trips are better made in the family auto or a scheduled airliner. This invention is best used for commuter type trips or trips of moderate distance where the utility of door-to-door transportation is an advantage.

4. The combining of the desired functions of vertical tail movement, wheel retraction/extension and engine rotation are all done by one rotating spar that also serves to provide wing strength and anti-sway action to the vehicle. This approach to the challenges of this type of vehicle is essential because it minimizes the weight of the vehicle to ensure its practical performance and usability. The wing mounted on top of the fuselage can be state-of-the-art high strength with weight in the range of 100 pounds. An anti-sway augmentation system can be employed to supplement the action of the universal spar if independent wheel suspensions are incorporated. This may be necessary if the weight of the top wing presents a problem.

5. The combined masses of the engine, wheels, vertical tail structure and associated masses that are all pivoted about the transverse rotatable spar must all be balanced. That is, the preload on the tail wheels must be sufficient so that upon liftoff the masses all rotate to their respective flight positions (tail structures rotate downward, engine rotates to flight alignment, and wheels retract.) This balance can be established with an adjustable engine pivot or by altering spring coefficients on the shock absorbers. The engine pivot would be near the center of gravity of the pivoted mass of the engine and propeller but moving the pivot forward (away from the pusher prop) would increase tail wheel preload with the setup depicted.

6. Conversion from ground travel to flight is mostly automatic except the top wing must be rotated by hand prior to takeoff and the nose gear is retracted by a hand crank after liftoff. These operator functions can be powered by motors if the weight penalty is acceptable. Note that it is not possible to land with the main wheels retracted nor is it possible to travel on the ground with the powered airflow not tilted upward with the linkages depicted. The engine automatic tilt feature can be made to be independent of tail position if special requirements allow this alteration.

7. An alternate embodiment combines a single, centrally located vertical tail with twin power units equally spaced on each side of the vehicle all connected to the transverse spar or twin tails could be used with twin power units.

8. The tail assembly shock absorber can be made to be controlled by the operator so that the tail position and engine tilt or thrust alignment can be adjusted in flight. This can be done by pneumatic tubes connected to either side of the shock piston as shown in the drawing. Also, the engine tilt orientation can be made to be independent of the tail position. Similarly, the wheel and engine shocks can be controlled by the operator in flight or on the ground. Provisions can also be incorporated to make these alterations to be manual (with hand held tools) ground adjustments.

9. This invention lends itself to the incorporation of automatic control to be fail safe under all flight conditions and ground travel situations by the incorporation of a computer with an override control function. Inputs of airspeed, altitude, power parameter settings, tail and engine tilt positions, aerodynamic control positions, and other inputs could all be monitored by the computer. The weight and expense penalties of such an installation in mass production could be acceptable.

10. The main claim of this invention is the concept that tilting the power source of a rotating propeller or a jet type power unit and the resulting diverted airflow is safe for ground travel in close proximity to other vehicles or objects. The obvious reason for such a concept is that no separate power source is needed for ground travel with all its related heavy power wheel components eliminated. The use of a light weight safety net is required only under certain conditions for ground travel where only reduced power is required. The accelerated airflow at the rear of the ground traveling vehicle would not be a problem to a vehicle or object directly behind and adjacent to the vehicle because such a stream of accelerated air tends to draw in surrounding air instead of spreading out near the power source thus its effect would be negligible. The fact that full power is not realized for forward thrust on the ground is not a problem because full power is not required and ground travel is limited in a typical mission of this flying machine.

11. An additional, essential benefit of the tilted power source is the downward force that the thrust vector has on the vehicle for ground travel. The combination vehicle by its very nature is a conflict in design criteria. The airplane must be light weight to be effective while the ground vehicle must be sufficiently heavy to handle wind and road conditions. The tilted power source provides a needed "weight" force without adding actual weight to the machine. Various configurations allow flexibility in utilizing this aspect of the design. Two equally spaced twin power sources would allow differential application of power such that if a strong wind were blowing against say the left side of the vehicle then more power could be applied to the left engine to increase the hold down force on the left side is an example with required directional control authority.

12. Directional control could be made by pivoting the vertical tail surfaces near the transverse spar attachment point or the tail surfaces could be restrained in yaw at that point and directional control could be provide with rudders located at the rear of the vertical tails. A tail support means must be capable of travel in full 360 degree swivel as is often used. Testing is required to determine the best method to be used with control yaw/roll coupling and flutter considerations.

13. The top mounted wing is attached to the fuselage by a set of two circular rings with four equally spaced interface fittings that transfer wing lift load from the wing spars to the top longerons and frame of the fuselage. This is the proposed embodiment. An alternate method could be a center pivot where diagonal cross members would end at the four interface fittings or a "Lazy Susan" type turntable could be employed. This would allow the use of ballbearing raceways for easier rotation of the wing. Ballbearings could also be used in the proposed ring set with a slight angle machined into the interfacing surfaces to maintain the zero lash-up feature.

14. A transverse rotatable spar is attached to the rear spar of the bottom support wing which performs a myriad of functions. It adds bending strength to the rear spar and carries various other flight and ground loads. It transfers tail pivotal movement to the power unit and the ground support wheels to cause these components to pivot commensurately. The spar provides a pivot about which the support wheels can move independently if this is required. It also supports the engine mount through support bearings. Also, the spar extends the full width of the support wing which allows placement of various components along its entire length such as one, two or three power units, flip up safety grid nets, and other related components.

It should be noted that it is stated that the outrigger wheels are mounted on the rotatable spar by bearings that allow independent movement of the wheels but it is also stated that the angular position of the spar can be used to retract the wheels or extend them. This apparent conflict is explained by the fact that the main support wheels cannot be directly connected to the supported structure but must be suspended or connected through a shock absorber means. Thus the anchor point of the shock absorber is controlled by the position of the spar which in turn raises or lowers the wheels that can independently absorb the landing shock. This is not necessary if the tires can absorb the landing shock sufficiently or if the minimum ground clearance provided makes retraction of the landing gear to be not necessary with suitable large, flexible tires.

15. Provision can be made to rotate the power unit beyond the vertical to a reverse position so that engine thrust would cause the vehicle to travel in a reverse direction. This provision is not critical, however, because the lightness of the craft allows it to be pushed around by hand force.

16. A main wheel is aligned with the outrigger wheels at the center of the vehicle that can turn in unison with the outrigger wheels. This wheel is free wheeling during all operations except when a means of backing the vehicle is required. A small electric motor can be installed within the wheel with a centrifical clutch that engages with a brake drum surface to produce rearward motion. Provision can be made to engage the clutch as an auxiliary brake for the vehicle. This type of installation is feasible because of the relatively light weight of the vehicle would minimize the size of the motor.

17. The proposed embodiment is a compromise. It is not intended to be a high speed, high performance, weight lifting machine. However, with proper development and testing it is believed that it will perform the mission for which it is intended.

18. Recent advances in materials and fabrication techniques are readily available to the general aviation industry and home aircraft builders. The pressure is on to develop a combination machine because traffic conditions continue to worsen and only one surface level is available for increasing numbers of vehicles especially for commuters during peak travel times. The proposed vehicle presents a means whereby many routes and space can be utilized to alleviate this problem.

19. Positive yaw-roll coupling is claimed because of the low placement of the vertical tails and rudders. Thus not only is less or no aileron displacement required for a coordinated turn but the fact that less aileron is needed means that there is less adverse yaw caused by aileron differential drag. Therefore, not only is less rudder area required but less aileron area is needed with all other things considered to be the same.

20. The vertical tails can be shock mounted in flexible material at the tail boom-rotatable spar juncture. Also, it may be feasible to pivot the tails in unison directionally instead of having separate rudder control. However, special attention would be needed as to provisions for flutter control and similar dynamics.

21. The segmented rudder depicted is suggested because the pivotal tail presents a vertical component to the rudder force depending upon the vertical position of the tail. On the ground this is not a problem but as the tail rotates downward the lower segments of the rudder can cause a slight nose up trim change. Therefore, if this is a problem, the lower segments would have to be deactivated in flight or larger rudders could be mounted only at the top corners of the tail.

22. The depicted safety net installation shows a cavity within the support wing into which the webbing and operating spar retract. However, is it recognized that an equivalent installation could be made whereby the same installation could be made with the assemblies retracting into fuselage cavities. Thus it would depend upon the specific design which installation would be more appropriate.

The scope of the invention should be determined not by the embodiment illustrated but by the appended claims and their legal equivalents.

I claim:

1. An airplane and ground travel conveyance combined in one vehicle comprising: a ground support system, a single aerodynamic power source to propel the vehicle in flight and on the ground, means for tilting said power source to a negative pitch angle so that air flow from said power source does not adversely impinge upon other vehicles or objects adjacent to said vehicle during all ground surface operations as well as providing a downward component of thrust to provide ground travel stability against upsetting wind and road forces, said means for tilting further rotating said power source to be aligned to the optimum vehicle angle for flight operations, and said means for tilting is automatically controlled by the position of the ground support system such that contact with the ground tilts said power source to said negative pitch angle during ground operation and loss of contact with the ground tilts said power source to said optimum vehicle angle for flight operations.

2. The combined vehicle of claim 1 with a pair of extendible safety nets that prevent objects from striking the power source during ground surface operations with means to fully retract said nets into cavities within the right and left sides of the vehicle by means of a set of spokes that rotate about a hub with interconnecting web members that form the shape of a sector of a fan with a spar that draws the net out of the cavity to an extended condition and that rotates in a reverse direction to completely collapse the spokes and netting to a stowed position whereby all components of the nets are fully retracted within the vehicle enclosure with means for an operator of said vehicle to extend or retract said nets by hand movements of a control without the operator having to change position and without having to delay vehicle travel.

3. The combined vehicle of claim 1 with a wing positioned above a fuselage of said vehicle with means to rotate said wing a nominal ninety degrees about a vertical axis from a flight position to a ground travel position where the wing span is aligned with the fuselage with means to invert a pair of ailerons and a flap which are mounted at the rear of said wing so that these airplane control surfaces do not create lift in the ground stowed position and so that wing area is reduced for ground travel with means to index and secure the wing in either the extended flight position or the rotated ground travel position with the center of rotation of the wing located at mid span of the wing and at the mid point of the overall length of the vehicle with the span and overall length coinciding when this top mounted wing is in the ground travel stowed position.

4. The combined vehicle of claim 3 with an expandible fairing material that is attached to the top of a fuselage canopy that assumes a flat level position when there is no airflow over the fairing with the top wing in either the flight or the ground stowed position but that will expand and assume the contour shape between the canopy and the top mounted wing whenever air flows over the fairing material during all flight operations from liftoff to landing touchdown.

5. The combined vehicle of claim 2 with a pair of vertical tails located at the right and left sides of the rear of the vehicle with means to allow pitch rotation of said tails in unison about a horizontal axis in angular pitch rotation with a ground travel full swivel support means located at the bottom rear of each tail that control the elevation of the tail surfaces to be rotated upward while on the ground, and upon loss of contact with the ground means to rotate the tails downward below the vehicle while fully airborne to a sufficient angle to provide positive yaw/roll coupling in banking, turning maneuvers.

6. The combined vehicle of claim 5 with a spar that rotates about a horizontal axis in pitch rotation that is attached to the rear of a bottom wing with said spar attached to said tails and said power source and a set of rear support wheels by means that tilt or level said power source and extend or retract a set of rear support wheels depending on the position of the tails.

7. The combined vehicle of claim 6 with a hook device attached to the bottom of each vertical tail structure forward of the full swivel ground support means that is capable of arresting the forward motion of the vehicle when the vehicle contacts ground surfaces that are not capable of supporting the vehicle but said hook will not engage prepared surfaces that will allow free travel of the vehicle.

8. The combined vehicle of claim 6 with two power sources providing vehicle thrust for both flight and ground travel.

9. The combined vehicle of claim 6 with a wing positioned above a fuselage of said vehicle with means to rotate said wing a nominal ninety degrees about a vertical axis from a flight position to a ground travel position where the wing span is aligned with the fuselage with means to invert a pair of ailerons and a flap which are mounted at the rear of said wing so that these airplane control surfaces do not create lift in the ground stowed position and so that wing area is reduced for ground travel with means to index and secure the wing in either the extended flight position or the rotated ground travel position with the center of rotation of the wing located at mid span of the wing and at the mid point of the overall length of the vehicle with the span and overall length coinciding when this top mounted wing is in the ground travel stowed position, with an expandible fairing material that is attached to the top of a fuselage canopy that assumes a flat level position when there is no airflow over the fairing with the top wing in either the flight or the ground stowed position but that will expand and assume the contour shape between the canopy and the top mounted wing whenever air flows over the fairing material during all flight operations from liftoff to landing touchdown, with a hook device attached to the bottom of each vertical tail structure forward of the full swivel ground support means that is capable of arresting the forward motion of the vehicle when the vehicle contacts ground surfaces that are not capable of supporting the vehicle but said hook will not engage prepared surfaces that will allow free travel of the vehicle.

10. The combined vehicle of claim 5 with segmented rudders mounted at the trailing edge of said vertical tails with means to deactivate the lower segments whenever the tail is in the lowered position to minimize pitch trim change due to tail position.

11. An airplane with a wing positioned above a fuselage of said airplane with means to rotate said wing a nominal ninety degrees about a vertical axis from a flight position to a ground travel position where the wing span is aligned with the fuselage with means to invert a pair of ailerons and a flap which are mounted at the rear of said wing so that these airplane control surfaces do not create lift in the ground stowed position and so that wing area is reduced for ground travel with means to index and secure the wing in either the extended flight position or the rotated ground travel position with the center of rotation of the wing located at mid span of the wing and at the mid point of the overall length of the vehicle with the span and overall length coinciding when this top mounted wing is in the ground travel stowed position.

12. The airplane of claim 11 with an expandible fairing material that is attached to the top of a fuselage canopy that assumes a flat level position when there is no airflow over the fairing with the top wing in either the flight or the ground stowed position but that will expand and assume the contour shape between the canopy and the top mounted wing whenever air flows over the fairing material during all flight operations from liftoff to landing touchdown.

13. The airplane of claim 12 with a pair of vertical tails located at the right and left sides of the rear of the vehicle with means to allow pitch rotation of said tails in unison about a horizontal axis in angular pitch rotation with a ground travel full swivel support means located at the bottom rear of each tail that control the elevation of the tail surfaces to be rotated upward while on the ground, and upon loss of contact with the ground means to rotate the tails downward below the vehicle while fully airborne to a sufficient angle to provide positive yaw/roll coupling in banking, turning maneuvers.

14. The airplane of claim 13 with a hook device attached to the bottom of each vertical tail structure forward of the full swivel ground support means that is capable of arresting the forward motion of the vehicle when the vehicle contacts ground surfaces that are not capable of supporting the vehicle but said hook will not engage prepared surfaces that will allow free travel of the vehicle.

* * * * *